Figure 1:
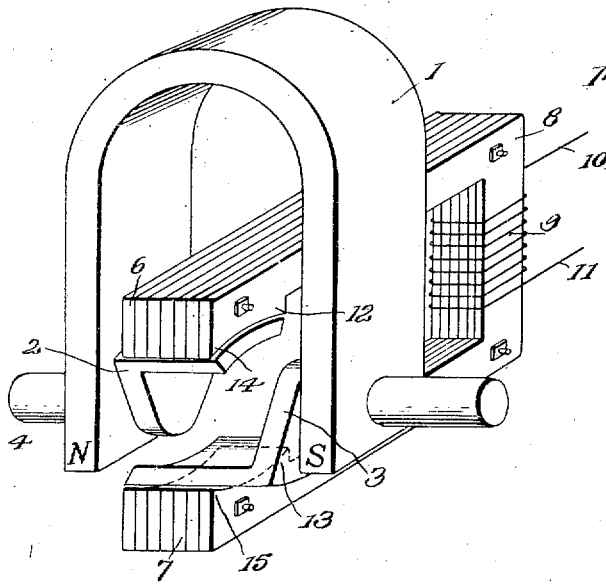

C. T. MASON.

IGNITION DYNAMO.

APPLICATION FILED JULY 5, 1917.

Reissued Oct. 2, 1917. 14,373.

Witnesses:
Grace C. Ingerton
Marguerite O'Brien

Inventor
Charles T. Mason

By H. R. VanDeventer.
Attorney

UNITED STATES PATENT OFFICE.

CHARLES THOMAS MASON, OF SUMTER, SOUTH CAROLINA, ASSIGNOR, BY MESNE ASSIGNMENTS, TO SPLITDORF ELECTRICAL COMPANY, OF NEWARK, NEW JERSEY, A CORPORATION OF NEW JERSEY.

IGNITION-DYNAMO.

14,373. Specification of Reissued Letters Patent. Reissued Oct. 2, 1917.

Original No. 1,081,760, dated December 18, 1913, Serial No. 692,754, filed April 23, 1912. Application for reissue filed July 5, 1917. Serial No. 179,094.

*To all whom it may concern:*

Be it known that I, CHARLES THOMAS MASON, a citizen of the United States, residing at Sumter, in the county of Sumter and State of South Carolina, have invented certain new and useful Improvements in Ignition-Dynamos, of which the following is a specification, reference being had to the accompanying drawing.

My invention relates to electric generators, and particularly to that class of generators used for igniting the charge in internal combustion engines, for firing electric primers used in artillery, and for igniting blasting caps. Such machines are commonly termed "ignition dynamos", and while my invention is peculiarly applicable to such machines, it will be understood that the principle of construction may be used in a dynamo for any purpose.

My invention consists more in the principle of design or the method of producing ignition, than in the actual mechanical arrangement of the parts of the dynamo, as numerous arrangements will be obvious to those skilled in the art. All such arrangements will, however, embody the principle of design which I claim is new.

As my invention is particularly adapted to ignition dynamos, I describe the same as applied thereto, and will point out the difference between my design and existing types and enumerate the objects accomplished and the advantages attained. Ignition dynamos are, broadly speaking, of two general types, one of which has an armature adapted to be moved in the magnetic field, and containing a winding in which the current is generated. The other type has a stationary winding, and a movable rotor so positioned that it causes the magnetic flux to pass through the winding, thereby generating a current.

In all types the generation of current is produced by altering the path of the magnetic flux, and in many machines this path is alternately established, broken and reversed through the winding; in every case the armature or rotor is subjected to a reversal of flux through its mass, except in certain machines where the entire magnetic structure for producing the field is revolved.

The type of machine having a winding on the armature is open to the objections that the winding space is necessarily limited, the windings are difficult to insulate, the wire turns on the ends are practically inactive, and actually impede the current generated, the circuits must be brought out through sliding contacts which are liable to give trouble and which introduce an extra resistance in the circuit, a special grade of iron laminæ must be used for the armature, and it is very difficult to advance and retard the position of the spark in the case of alternating current machines, as the intensity of the spark varies with the relation of the armature to the pole pieces.

In the rotor type many of the foregoing objections remain, and, in addition, many of these machines produce four impulses of current per revolution when a permanent magnet field is used, there are usually four air gaps instead of two as is the case with the wound armature type, and the difficulty of advancing and retarding the spark remains. The rotor type is commonly lacking in efficiency as compared with the wound armature type.

I eliminate all the above objections by my improved construction which embodies the advantages of both types, as hereinafter described, and which broadly consists of the employment of a stationary magnet and a rotor in connection therewith, so positioned that the magnetic flux is established through the winding, the rotor at all times maintaining the same polarity in relation to the magnet. The importance of this method of construction is very great when the advantages derived therefrom are considered. To make these fully evident, reference is had to the accompanying figures, in which—

Figure 2:
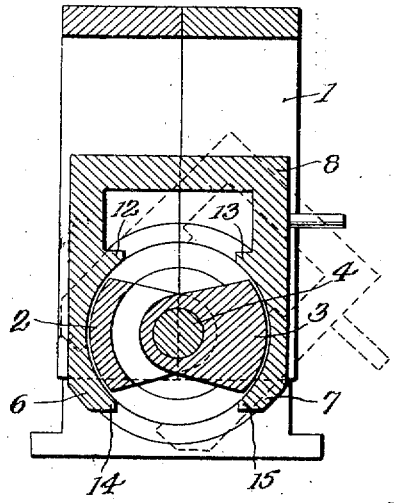
Figure 3:
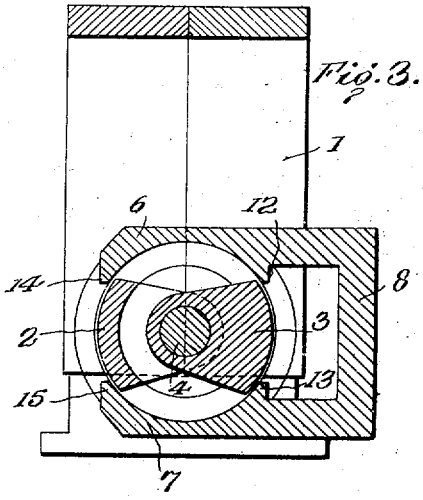

Figure 1 is a diagram illustrating the principle of construction of a dynamo embodying my invention;

Fig. 2 a side view of the same with the field member in one position;

Fig. 3 with the field member shifted from the position shown in Fig. 2; and

Figure 4:
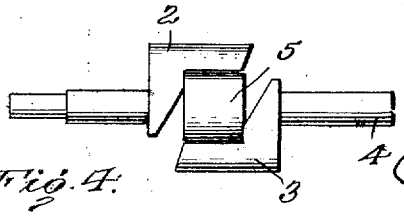

Fig. 4 is a detailed view of the rotor.

1 denotes a permanent magnet, between the poles of which is positioned the rotor comprising spaced magnetic inductor elements 2 and 3, carried by shaft 4, which is free to revolve. There is no space between the inductor members 2 and 3, and the inner cheeks of the magnet 1. The ends of the polar extensions 2 and 3 are contiguous to the inner cheeks of the magnet poles, and may abut as shown directly against the same, in extended frictional contact therewith, during their entire rotation; but in any case must be maintained in continuously metallic magnetic contact relation, mediate or immediate, with said poles, to carry the flux therefrom without any open air gap. As this is a close fit, air gaps are eliminated.

As the inductor members 2 and 3 always maintain the same polarity as the extremities of the magnet to which they are connected, there is no reversal of magnetic flux through them, and they may be made of the same material as the magnet; or any magnetic material. They may be drop forgings. This eliminates the necessity for lamanæ in the rotor, and greatly increases the efficiency and speed of operation. There being no reversal of flux in the rotor, there is no "lag" in this portion of the magnetic circuit, as is the case with machines in which a reversal or stoppage of the flux takes place at every movement of the armature. The inductor members 2 and 3 are joined together to form one rotating element, by means of the block 5 of suitable non-magnetic material. This block is omitted in Fig. 1 to more clearly permit the operation of the dynamo to be understood.

6 and 7 are the ends of a normally stationary core 8 of any suitable form, upon some portion of which is placed the winding 9. This core is preferably laminated, and the ends of same are bored so as to permit the rotor formed of 2, 3 and 5 to move between them with only a small air gap intervening. The path for the flux from the end 6 of the core 8 to the end 7, through the part on which the coil is wound should be as short as possible. The length in Fig. 1 is somewhat exaggerated so as to bring the coil outside the magnet where it could be seen. The core 8 is free to move angularly about the axis of the rotor as shown in Figs. 2 and 3, so that it can be placed in any position to bring its ends 6 and 7 in different relation to the inductor members 2 and 3. Fig. 2 shows what may be termed the normal or retard position, the rotor moving from right to left, Fig. 3 shows the advanced position, the core having been revolved so that the rotor meets the ends 6 and 7 "sooner", thereby advancing the spark. It will be observed that the winding space on 8 can be much larger than the space on a wound armature, and every turn is effective, the shape of the space is such that the coil is easy to wind and insulate, all sliding contacts are eliminated as the wires 10 and 11 may be connected directly to the device to be operated, and that the intensity of the spark is the same either advanced or retarded, as the position of the core with respect to the rotor, makes absolutely no difference in the variation of the magnetic flux through the core of the coil. This construction produces only two impulses of current per revolution of the rotor, and is therefore adapted to be used in standard ignition systems running at engine speed, without producing false explosions, or requiring timing cams. The necessity for revolving a large and heavy magnet structure is obviated, as a marked increase in efficiency results from the absence of the necessity of reversing the flux through the rotor, and the bringing out, as it were, of the magnet directly to the face of the coil carrying core 8.

The operation of a dynamo constructed as described is as follows:—

Considering the left hand pole of the magnet 1 to be of N polarity, inductor element 2 is of the same polarity, and remains so, regardless of any position in which it may be. The rotor as a whole, being in the position as shown in Fig. 1, the magnetic lines will flow from the N pole of magnet 1, through rotor element 2, to the end 6 of coil core 8, to end 7, to rotor element 3, to the side of the magnet. 3 is always of the S sign. As the rotor revolves from right to left, elements 2 and 3 bridge the gap between the edges 12 and 13, 14 and 15, as shown in Fig. 3, and magnetically short circuit the coil core 8. This sudden change in the flux induces an electromotive force in the winding 9. The rotor, continuing to revolve, reaches the position where element 3 is uppermost, and then a reversal takes place, the path of the flux being from N to 2, to 7 through 8 to 6, to 3, to S. When the rotor reaches a position the reverse of that shown in Fig. 3, the coil core is again magnetically short-circuited and the peak of electromotive force of opposite polarity induced in the coil. An oscillation of the armature will produce the same result, provided the rotor and core cheeks are properly proportioned.

From the above description it will be apparent that the invention also includes the method of producing ignition current which is constant in tension and volume through all angles of advance and retard, which method consists in creating a constant magneto motive force constituting a fixed magnetic field. This is produced by the fixed magnets 1, then rotating a portion of the flux due thereto about an axis parallel to the direction of the flux in said portion. That is to say, the flux between the poles of the magnet is rotated about an axis which is parallel to the direction of the flow of flux from one pole of the magnet to the other and then intermittently completing and reversing the path of the flux through a flux receiving circuit having an ignition current generating coil and relatively adjusting the said flux receiving circuit and rotated flux for timing purposes.

In the apparatus disclosed this intermittently completing and reversing of the path of the flux is accomplished by the rotor and the adjusting of the flux receiving circuit is accomplished by shifting the core 8 angularly about the axis of the rotor.

I am aware that it is not new to use a stationary magnet and a winding on a coil core, with a rotor between the two, but in all such structures the rotor simply revolved in a stationary field, and was subjected to the same magnetic reversal as the winding on the coil core. The important feature of my invention is the employment of the magnet with movable inductor members, which members at all times maintain the same polarity, and which serve to alter the path of the magnetic flux acting on the winding. Every turn in my coil is effective, as there are no dead ends, the flux passing the wire instead of the wire through the flux.

While I have shown only one winding, it is obvious that more than one winding may be employed, and that the dynamo may be used with a circuit breaker, and distributer and other auxiliary devices such as commonly employed with high tension ignition dynamos.

Having thus described my invention, what I claim as new and desire to secure by Letters Patent, is:—

1. In an igniting dynamo, a U-shaped magnet, and a rotor having a path of travel which lies entirely within the space between the poles of said magnet and comprising magnetic inductor elements in continuous magnetic contact relation with the inner cheeks of both magnet poles and thereby maintained of permanent and opposite polarity, together with a normally stationary current generating coil and a core therefor in inductive relation to said rotor.

2. In an ignition dynamo, a U-shaped field magnet having poles spaced apart, a rotor journaled to turn between said poles extending from pole to pole of the magnet, said rotor comprising magnetic elements of permanent and opposite polarity having rotary contact with the side faces of said magnet poles independently of the journal bearings and a normally stationary current generating coil and core therefor normally fixed in inductive relation to said rotor.

3. In an ignition dynamo, a U-shaped field magnet having poles spaced apart, a rotor journaled to turn between said poles extending longitudinally from pole to pole of the magnet and having suitable bearing supports, said rotor comprising a pair of axially separated magnetic members of permanent and opposite polarity having end surfaces in extended sliding contact with the inner faces of said magnet poles independently of said bearing supports, together with a normally stationary current generating coil and a core therefor in normally fixed inductive relation to said rotor.

4. In an ignition dynamo, a permanent field magnet comprising one or more individually integral U-shaped permanent magnets, said field magnet having axially alined apertures in opposite poles, a rotor having shaft extensions journaled in said apertures, and having a main body adapted to be magnetized by said permanent magnet, together with a normally stationary current generating coil in inductive relation to said rotor.

5. In an ignition dynamo, a substantially U-shaped permanent magnet having axially alined bearing apertures in its poles, a rotor journaled in said apertures and having end portions of magnetic material of permanent and opposite polarity in magnetic and conductive relation respectively to the inner faces of said poles but magnetically insulated from each other, together with a normally stationary current generating coil and core therefor in inductive relation to said rotor.

6. In an ignition dynamo, a permanent magnet having poles spaced apart and having inner cheeks opposite and parallel to each other, and a rotor between said magnet poles having a right cylindrical path of rotation and end surfaces of magnetic material rotating in contact with the inner parallel cheeks of the field poles, but magnetically insulated from each other, together with a normally stationary current generating coil in inductive relation to said rotor.

7. In an ignition dynamo, a U-shaped magnet, and a rotor having a path of travel lying entirely within the space between the magnet poles and comprising magnetic inductor elements of permanent and opposite polarity, together with a normally stationary generating coil and core in direct inductive relation to said rotor and shiftable bodily with respect to the path of movement thereof whereby the timing of the generated electromotive force may be varied.

8. The method of producing ignition current which is constant in tension and volume through all angles of advance and retard which consists in creating a constant magneto-motive force constituting a fixed magnetic field, rotating a portion of the flux due thereto about an axis displaced from the normal to the direction of said flux portion, intermittently completing and reversing the path of said flux portion through a flux receiving circuit having an ignition current generating coil and relatively adjusting said flux receiving circuit and the rotated flux for timing purposes.

9. The method of producing ignition current which is constant in tension and volume through all angles of advance and retard which consists in creating a constant magneto-motive force constituting a fixed magnetic field, rotating a portion of the flux due thereto about an axis parallel to the direction of the flux in said portion, intermittently completing and reversing the path of said flux portion through a flux receiving circuit having an ignition current generating coil and relatively adjusting said flux receiving circuit and rotated flux for timing purposes.

In testimony whereof, I affix my signature.

CHARLES THOMAS MASON.